United States Patent [19]
Terrill

[11] 4,319,834
[45] Mar. 16, 1982

[54] SUBTRACTIVE COLOR PRINTING DEVICE

[76] Inventor: Kenneth P. Terrill, 705 John's Dr., Euless, Tex. 76039

[21] Appl. No.: 122,606

[22] Filed: Feb. 19, 1980

[51] Int. Cl.³ .............................................. G03B 27/72
[52] U.S. Cl. ......................................... 355/35; 355/38
[58] Field of Search .............................. 355/38, 35, 83; 310/49 R

[56] References Cited

U.S. PATENT DOCUMENTS

| Re. 28,075 | 7/1974 | Kavanaugh | 310/49 R |
|---|---|---|---|
| 1,653,946 | 12/1927 | Clausen | 310/49 R |
| 3,709,601 | 1/1973 | Zahn et al. | 355/38 |
| 3,813,158 | 5/1974 | Zahn et al. | 355/38 |
| 4,101,217 | 7/1978 | Fergg et al. | 355/38 |
| 4,149,799 | 4/1979 | Pone et al. | 355/38 |
| 4,175,853 | 11/1979 | Harvey | 355/38 |
| 4,235,551 | 11/1980 | Harvey | 355/38 |

FOREIGN PATENT DOCUMENTS 697793  11/1964  Canada .................................. 355/38

Primary Examiner—Monroe H. Hayes
Attorney, Agent, or Firm—Alan T. McCollom

[57] ABSTRACT

A subtractive color printing device for use between a source of white light and a color transparency or negative intended to be exposed to at least a portion of the spectrum of such source. An aperture is disposed in the exposure path between the light source and the negative. A plurality of color filters, each mounted on a separate carrier frame, are positioned for independent adjustment to different positions between one position fully exposing and another position fully spanning the aperture. Each filter carrier is driven to such different positions by a motor. A computer is programmed to power the motors, upon a user input, to drive the filter carriers to preselected positions.

6 Claims, 7 Drawing Figures

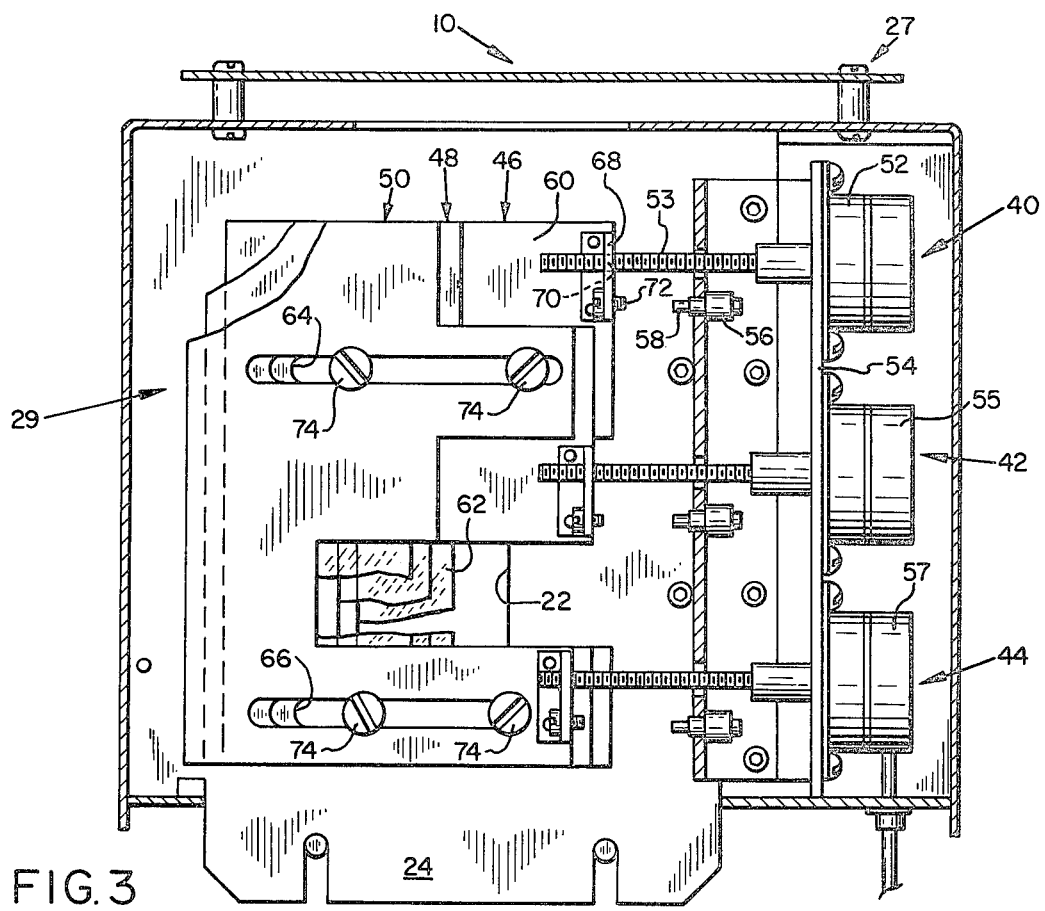
FIG.3
FIG.4
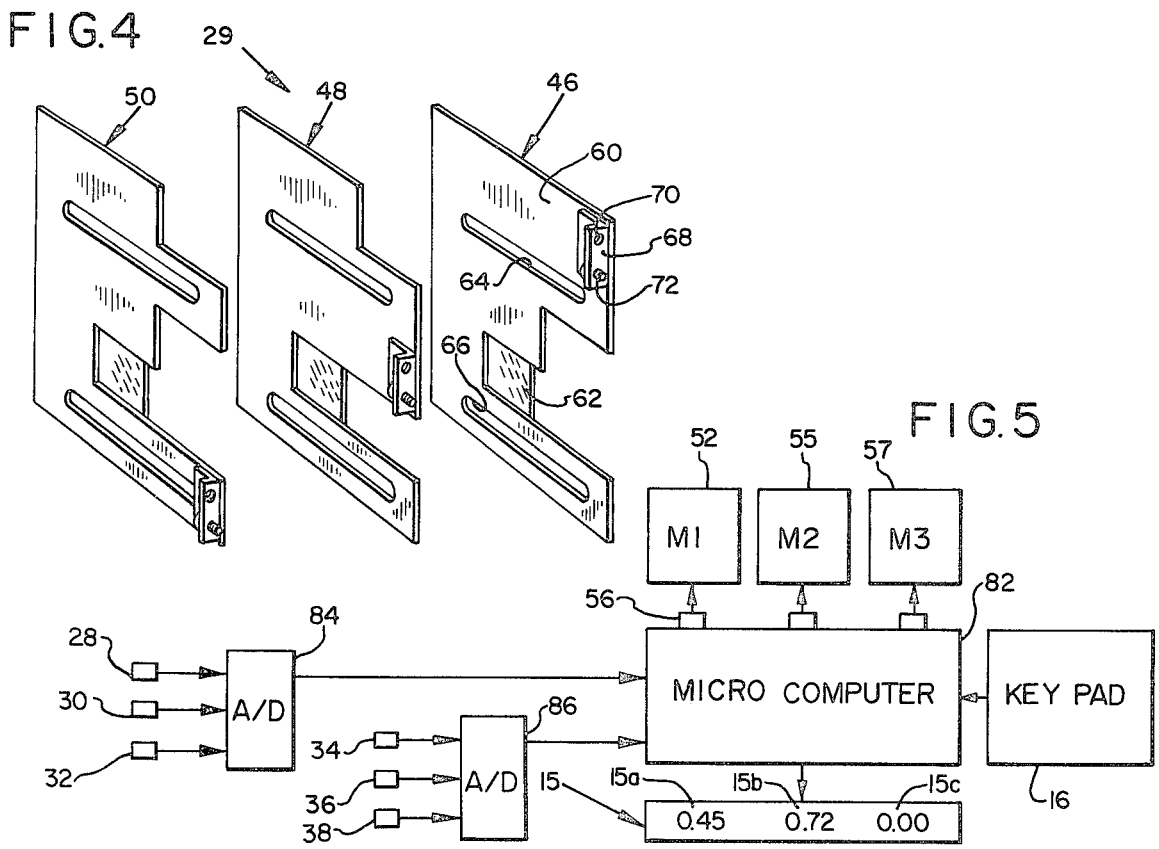
FIG.5

SUBTRACTIVE COLOR PRINTING DEVICE

BACKGROUND AND SUMMARY OF THE INVENTION

This invention pertains to color photograph printers and enlargers and more particularly to subtractive-printing-type lamp houses.

In the usual subtractive printer, a plurality of filters are inserted between a source of white light and a color negative or transparency which is to be printed. Typically, three filters, magenta, cyan and yellow are used. Also typical, the filters are each mounted in a slidable carrier frame, all of such frames being adjacent an aperture and slidable to block a selected portion of the aperture. Thus, by positioning of the frames with respect to the aperture, a desired light mix may be obtained for printing the photograph.

The amount and type of filtration of the white light determines the colors in the final photograph. Accordingly, the positioning of each filter with respect to the aperture is a critical function of every color printer. Such positioning must be accurate and there must also be provision for accurate return to prior positions so that previously obtained color densities in photographs may be reproduced. To complicate matters, there is a logarithmic relationship between the position of each filter with respect to the aperture and the density of its associated color which appears in the final print. In other words, when one filter is moved from a position fully exposing the aperture to a position fully spanning the aperture, the decrease in light intensity as the filter first blocks the aperture is much smaller, for a given amount of movement, than when such movement occurs when the filter has nearly spanned the aperture. In the past, each filter has been positioned by a non-linear cam, such cam either moving the filter carrier toward a position spanning the aperture or toward a position fully exposing the aperture depending upon the direction of rotation of the cam. The cam is machined to correspond to the above-described logarithmic relationship so that equal amounts of rotation produce equal amounts of light intensity change regardless of the position of the filter with respect to the aperture.

In the past, such logarithmic cams have been hand operated as opposed to motor operated due to the critical positioning required for the filters. Even so, such prior art positioning does not allow precision placement of the filters with respect to the aperture so that exact light intensities for each filter may be obtained. Another problem in the prior art is that once a desired position is obtained, it is extremely difficult to reposition the filters to the desired position after they have been moved.

According to a preferred embodiment of the instant invention, the above-described filter carriers are positioned by stepper motors, each driving a screw shaft, such being interconnected with its associated filter carrier. Each stepper motor (and therefore each filter) is under the control of a minicomputer. Stored in the computer's memory is what might be thought of as a "look-up table" for each motor. Such table includes a plurality of density point values, each such value being associated with a number of steps required to drive the motor until the filter is positioned to generate the density point value for its associated color. Additionally, a photosensor, one for each filter, may be placed in the path of the mixed light. The output of each photosensor is converted to a digital signal and fed back to the computer. Such feedback is used to insure that when a user selects a specific density point value for a certain filter, that such density point value will be achieved.

Thus, a general object of the invention is to provide accurate color filtering position in a color printing device.

A more specific object of the invention is to provide such positioning with the use of sensor feedback which samples the intensity of the light associated with each filter.

Another object of the invention is to provide exact repositioning of the filters, so that a given filter combination may be exactly reproduced when the user so desires.

These and other objects and advantages of the invention will become more fully apparent as the description which follows is read in conjunction with the accompanying drawings.

DESCRIPTION OF THE DRAWINGS

FIG. 3 is a view taken along the line 3—3 in FIG. 2.
FIG. 4 is an exploded perspective view (in a reduced size) of selected components from the view of FIG. 3.
FIG. 5 is a schematic diagram of the instant embodiment of the invention.

DETAILED DESCRIPTION OF THE INVENTION

Figure 1:
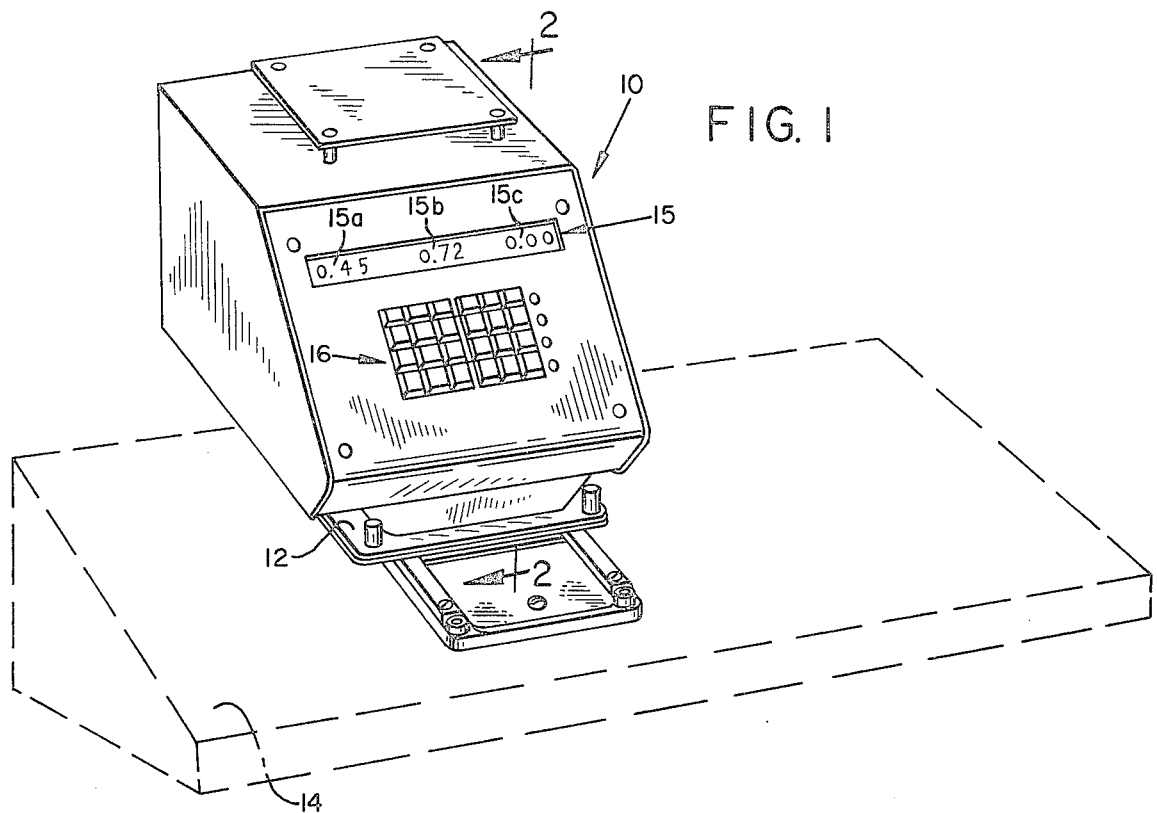
FIG. 1 is a perspective view of the invention.

Indicated generally at 10 is a housing, such including therein a preferred embodiment of the invention, a subtractive color printing device. The device is used to make a photographic print from a color negative or transparency, a negative being framed in a holder 12. Housing 10 and holder 12 are positioned over a conventional printing body 14 (shown in dash lines). Printing body 14 is of conventional construction and includes a lens for focusing the image of the negative within holder 12 and a platform for supporting the photographic paper upon which the print is made. Included within the device is an alphanumericentry key pad 16, also referred to herein as input means. Also included within the device and contained within housing 10 are a white light source and three color filters.

Speaking now in only general terms of the operation of the device, a negative for printing is positioned within carrier 12. A user enters desired density point values on key pad 16, one such value for each filter. Each number so entered appears on display 15, such including a density point value display 15a, 15b, 15c for each filter. The printing device precisely positions each of the three filters so that the desired density, for each color, is obtained in the device and in the subsequently printed photograph.

Figure 2:
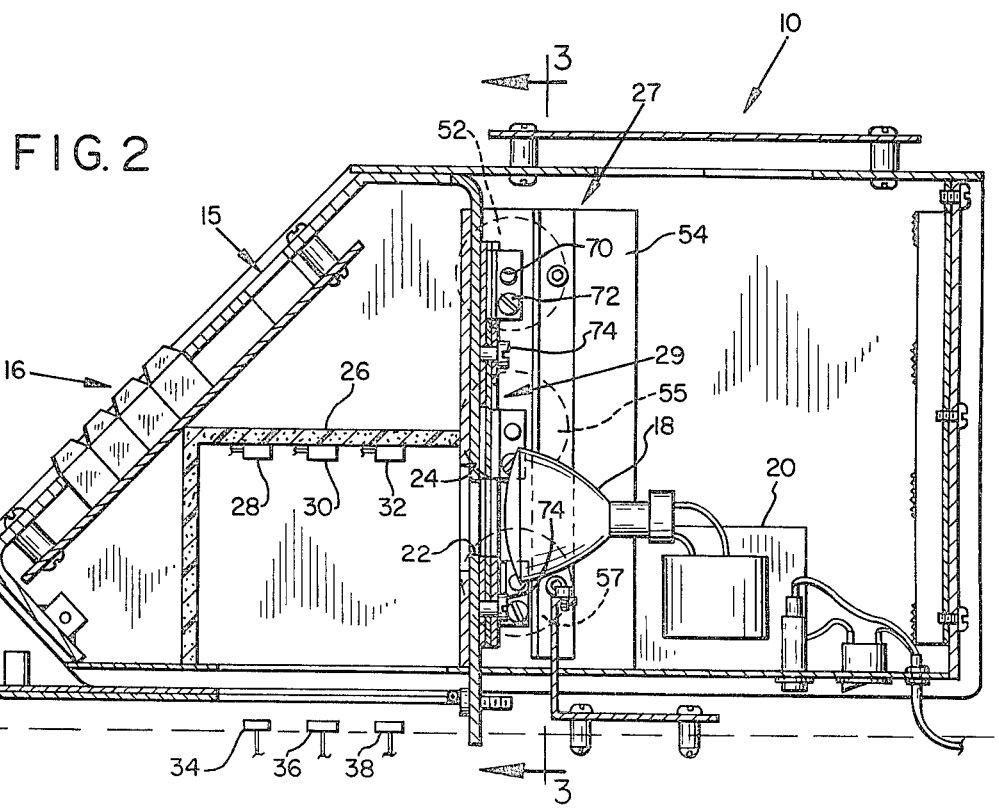
FIG. 2 is a view taken along the line 2—2 in FIG. 1.

Turning now to FIG. 2 for examination of structure contained within housing 10, a lamp 18 or white light source is supplied power via a conventional transformer 20. Lamp 18 is mounted in the position illustrated on a bracket (not shown). Lamp 18 is positioned so that, when the lamp is on, light passes through an aperture 22. The lamp is connected to a conventional timer (nor shown) so that illumination is present only for a preselected time. The aperture is formed in plate 24, such being referred to herein as means defining an aperture. When lamp 18 is emitting light, the light passes through aperture 22 into a diffusion box 26. Box 26 has a reflective interior and is formed in the shape of a cube with two sides missing. There is no side to box 26 in the direction of aperture 22 and there is no side in the direction of holder 12. Thus, any light entering box 26 through aperture 22 exits box 26 only in the direction of holder 12. Indicated generally at 27 is what is referred to herein as linear drive means. Also indicated generally, at 29, is plural color filter means.

Positioned within box 26 are translation sensors 28, 30, 32. Mounted on structure (not shown) beneath holder 12 are color integration sensors 34, 36, 38. Each of the sensors is connected to a microcomputer (shown schematically in FIG. 5). Each of the sensors includes a conventional photomultiplier tube or phototransistor which is used to detect light intensity. However, each photocell is surrounded by a filter of a certain color so that only that color of light will be detected. Sensors 28, 34 are each surrounded by a red filter and will detect only red light. Sensors 30, 36 are blue filtered for detecting blue light and likewise, sensors 32, 38 are filter for green light detection.

For a better view of filter means and linear drive means, attention is now directed to FIG. 3. The instant embodiment of the invention utilizes linear drive means which includes three electric motors and screw shaft combinations, each of such combinations being indicated generally at 40, 42 and 44. Associated with each combination is color filter means 46, 48, 50, respectively.

Included within combination 40 is a stepper motor 52, also referred to herein as an electric motor or stepper motor means. A threaded screw shaft 53 extends from motor 52 and is driven by the same. The motor is mounted on a bracket 54 which is fixed at a substantially right angle to color filter means 46, 48, 50. A limit switch 56 having an actuator 58 is mounted as shown on another portion of bracket 54. Actuator 58 extends from bracket 54 substantially parallel to shaft 53 and when the actuator is depressed, switch 56 opens, cutting power to motor 52. Combinations 42, 44 (including motors 55, 57, respectively) are likewise constructed and mounted on bracket 54 and each has an associated limit switch like switch 56 for combination 40.

Looking now at color filter means 46, in both FIG. 3 and FIG. 4, included therein is a carrier frame 60 and a color filter 62, such filter being attached to and supported by frame 60. Frame 60 includes a pair of elongate slots 64, 66 which extend through the frame. Slots 64, 66 are substantially parallel and are of substantially the same length. Mounted on frame 60 and extending at a substantially right angle is a bracket 68. Included on bracket 68 are a pair of threaded holes, one such hole being hole 70. Hole 70 is adapted for engagement with shaft 53 as illustrated in FIG. 3. The other hole in bracket 68 accommodates a screw 72 which extends at a right angle from bracket 68. Carrier frame 60 is slidably mounted on plate 24 (shown in FIG. 2) by screws 74, such extending through slots 64, 66. This construction permits plate 60 to be slidable toward and away from bracket 54.

The remaining color filter means 48, 50 are of similar construction to means 46. As can be seen in FIG. 4, the brackets, like bracket 68, are in different positions for each of filter means 48, 50. Further, the perimeter of the carrier frames (corresponding to carrier frame 60) of color filter means 48, 50 is differently shaped from that of frame 60. Such different shapes are to allow slidable movement of each of the frames of filter means 48, 50 without interference of any of the other frame-mounted brackets. Also, each color filter means 48, 50 includes a color filter like filter 62 mounted on and supported by their respective carrier frames. Each of the three filter means 46, 48, 50 includes a different color filter, in the instant embodiment, one being cyan, one magenta and one yellow.

Figure 6:
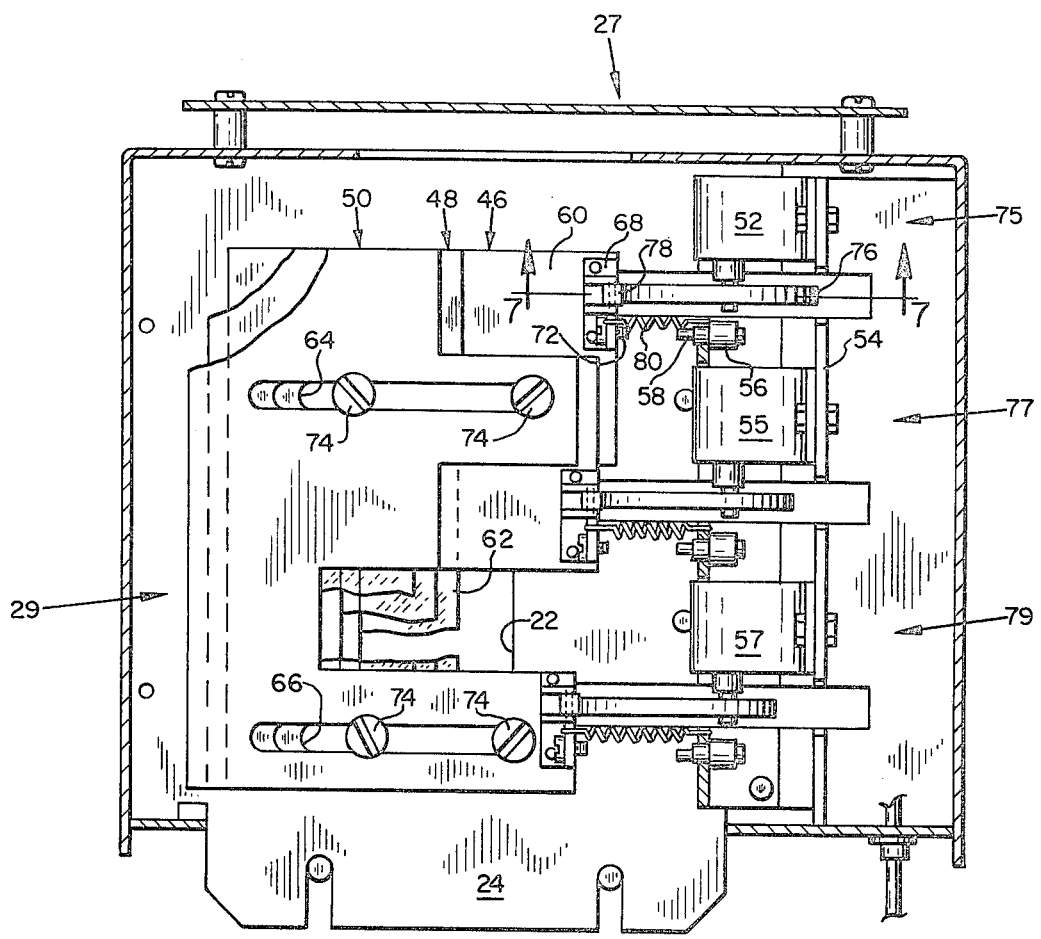
FIG. 6 is a second embodiment of the invention viewed like the view of FIG. 3.
Figure 7:
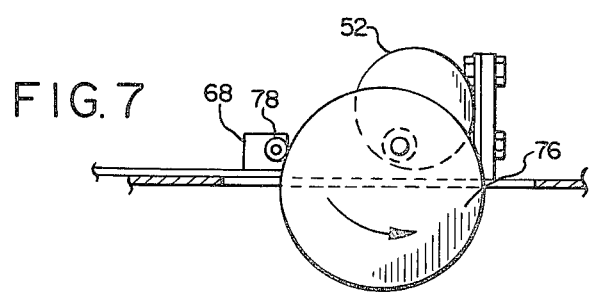
FIG. 7 is a view taken along line 7—7 in FIG. 6.

Examination will now be made of a second embodiment of the invention, that embodiment appearing in FIGS. 6 and 7. Many of the same features as the previously-described embodiment are present in the embodiment of FIGS. 6 and 7 and are numbered to correspond to structure which has already been described. The main difference in the two embodiments is that the linear drive means in the embodiment of FIGS. 6 and 7 includes three electric motor and cam combinations, each of such combinations being indicated generally at 75, 77, and 79. Combination 75 includes a linear cam 76, such being attached to the shaft of motor 52. A roller 78 is rotatably mounted on bracket 68 in lieu of the threaded hole in the previously-described embodiment. Additionally, in the embodiment of FIG. 6, a spring 80 is attached on one end to frame 60 and on the other to bracket 54, such attachment to the bracket occurring adjacent actuator 58. Each of the other combinations 77, 79 is similarly constructed.

Looking now to FIG. 5, illustrated therein is a schematic diagram of a portion of the instant embodiment of the invention. The circuitry of FIG. 5 is designed for and is suitable for use with either of the previously-described embodiments of the invention. Key pad 16 provides a user-activated input to a microcomputer 82, or computer means. Included within microcomputer 82, although not separately shown, is a memory means or memory. Also providing inputs (as will be later more fully explained) to microcomputer 82 are a pair of analog-to-digital converters 84, 86. Connected to converter 84 and at times supplying inputs thereto are sensors 28, 30, 32. Likewise, sensors 34, 36, 38 are connected to converter 86. Microcomputer 82 also provides signals, along the interconnection as shown, which activates previously-mentioned electronic display 15. The microcomputer also provides output signals, under certain conditions, to motors 52, 55, 57 shown schematically as M1, M2 and M3, respectively.

The microcomputer drives each motor by providing to it a series of pulses, each such pulse therein having a uniform width and magnitude. The total amount of rotation of the motor shaft is proportional to the number of pulses supplied to the motor. Also, the polarity of the pulse determines the direction of rotation. Accordingly, by providing a certain number of pulses having a specified polarity, the microcomputer can control both the direction and degree of rotation of each of the motors.

Prior to description of the calibration and operation of each of the embodiments of the instant invention, a brief examination of traditional subtractive color printing will be made. Three filters, cyan, magenta and yellow are interposed between a source of white light and an aperture. The cyan filter blocks red light, the magenta blocks green light, and the yellow filter blocks blue light. Each filter is positionable along a range of positions either fully spanning or fully exposing the aperture. Filtered light leaving the aperture is mixed, for example, in a box with a reflective interior. The filtered mixed light passes through a color negative or transparency and the image is projected through a lens system onto color photograhic paper which is later developed to produce a color print.

The position of each filter with respect to the aperture determines the intensity of light of a particular color which is used to project the image onto the photograhic paper. Accordingly, the filtration of each color controls the colors in the final print.

A device known as a densitometer may be used to measure the intensity of different colors of light. The densitometer includes a photosenstive detector which generates an electric signal related to the intensity of light shining thereon. If it is desired to measure the intensity of a specific color of light, a filter corresponding to that color may be interposed between the light source and the sensor, thus making the sensor responsive only to the intensity of light having the color of the filter. A standardized scale known as a log exposure scale has been developed to indicate the intensity of light. The scale begins at zero and advances by one hundreths, each one hundreth being commonly referred to as a density point. An increase in the density point value indicates a decrease in the intensity of the light, such decrease in light intensity being caused by an increase in filtration. For example, in the instant embodiment of the invention, yellow filtration is obtainable from 0.00 to 2.25 density points, magenta filtration from 0.00 to 1.54 density points, and cyan filtration from 0.00 to 1.54 density points. A 0.00 value is obtained when no filtration is present.

Consideration will now be given to the manner in which the instant embodiment of the invention is calibrated prior to use for printing color photographs. The device is set at an initial condition as follows: appropriate commands are entered on key pad 16 which instruct microcomputer 82 to drive motor 52 in FIG. 3. As motor 52 drives, shaft 53 turns and its threaded engagement with bracket 68 causes movement of frame 60 in the direction of the axes of slots 64, 66. Obviously, the direction of rotation of motor 52 (controlled by the microcomputer) determines the direction of travel of the carrier frame. For calibration, all of the frames are driven to the position shown for color filter means 50 in FIG. 3. That is, all of the frames are positioned so that each color filter is just to the left of aperture 22 in FIG. 3. Thus, the aperture is fully exposed, but movement to the right of any of the frames will dispose at least a portion of that frames filter across the aperture.

A densitometer (not shown) having three sensors, one for detection of yellow filtration, one for magenta filtration and one for cyan filtration is positioned so that its sensors can detect filtered mixed light emerging from diffusion box 26.

The densitometer is used to determine light intensities for each filter at different positions. By storing both the position of the filter and the density point value obtained at that position within the computer, a later user can set filtration values by simply entering the desired density point value into microcomputer 82 via key pad 16. Assume now, in FIG. 3, that filter 62 is the yellow filter and it is positioned at the initial condition as described above for calibration. Since in that position none of the filter blocks aperture 22, the densitometer reading for yellow filtration is 0.00. Stored in the microcomputer's memory with that densitometer reading, and with each subsequent reading as will shortly be explained, is the number of pulses required to drive motor 52 from its initial condition to the point at which the density point value is obtained. For 0.00 density points the number of pulses is zero.

By appropriate command to the microcomputer, motor 52 is provided with a pulse, causing it to drive so that filter 62 extends a very short distance across aperture 22. The densitometer reading is checked and motor 52 is again pulsed until the densitometer registers 0.01. The rotation of motor 52, and therefore the movement of frame 60, is so small that typically, one hundred pulses are required until color filter 62 is positioned so that the densitometer registers 0.01. At this point, the density point value of 0.01 is entered into the microcomputer and permanently stored in digital form in its memory. Associated with that density point value in the memory is the number of steps or pulses required to drive motor 52 from its initial condition to the position at which the 0.01 reading is obtained. The motor is again advanced step-by-step until a 0.02 density point value is obtained and again the number of steps from the initial condition associated with the number 0.02 is entered into the memory. In this manner, a look-up table, so to speak, is generated and stored within the computers memory. Due to the non-linearity of the relationship of the filter position with the intensity of the mixed light, as the filter extends across the aperture, the number of steps required to increase intensity by 0.01 point decreases.

The above-described calibration process is continued until filter 62 completely spans aperture 22, thus producing the highest obtainable density point value for yellow filtration. Filter 62 is then returned to its initial condition and the same process is repeated separately for each of the other two filters with the densitometer being used to detect the intensity of light corresponding to the filter being calibrated.

In one embodiment of the invention, the device is operable without sensors 28, 30, 32, 34, 36, 38 and description will now be made of the operation of the device without utilization of the sensors. First, a color negative is positioned in holder 12 so that it is located directly beneath diffusion box 26. When light 18 is turned on (as will later be described) light passes through the filters into box 26 through the negative, through a lens system (not shown) and a focused image is projected onto photographic paper (also not shown). After the negative is properly positioned, a density point value, one for each filter is entered into microcomputer 82 by the operator using key pad 16.

When a density point value is first entered, for a particular filter, the microcomputer is programmed to look up, so to speak, the value of the number of pulses from the initial condition (such being entered during calibration) which is required to drive the filter to the position corresponding to the desired density point value. Once the stored step number is obtained, the computer is programmed to calculate the number of pulses and the direction of travel required to move the filter so that the density point value entered is obtained. Once such computation is made, the correct number of pulses is applied to the motor and the filter is properly positioned. The pulses are applied quite rapidly and, in the normal range of filter usage, the time required for filter positioning is approximately 1½ seconds. Display 15, under control of the microcomputer, displays the density point value for each filter.

Under control of the operator, light 18 turns on for a predetermined amount of time selected by the operator, thus exposing the photographic paper to the selected amount of filtration. Typically, test prints are first made to determine the optimum amount of filtration and exposure time required. Once a desired filtration level is obtained, the value of filtration (density point value) of each of the filters is entered into a separate portion of the microcomputer's memory by pressing a key on key pad 16. When it is desired to return to the filtration levels so stored, only one key need be pressed on the key pad and all of the filters are repositioned to the stored values. Such repositioning for each filter occurs to within plus or minus 0.0005 inches. Such accuracy is important to reproduce desired color densities in a photograph. An advantage obtained by virtue of the above-described calibration method is that light intensities obtained on one device may be extremely accurately reproduced on another device. Thus, test prints can be made on one device to determine the optimum filtration value and such values, once determined, can be accurately reproduced on another device to produce final prints.

Examination will now be made of the operation of the device in conjunctions with sensors 28, 30, 32 and sensors 34, 36, 38. Translation sensors 28, 30, 32 are used to optimize filter positioning. In a typical operation, a desired density point value is entered onto key pad 16 for a certain filter. The microcomputer "looks up" the density point value and the number of steps associated therewith as described above. After the motor has driven the required number of steps, light 18 is turned on. Initially, there is either no photographic paper exposed in the light path or a blocking shutter is used to prevent exposure thereof. Each of sensors 28, 30, 32 senses the filtration value of an associated color filter. Each sensor generates a signal proportional to the amount of filtration, such being converted to digital form by analog-to-digital converter 84 and thence input from microcomputer 82. The microcomputer is programmed to compare the input value with the desired value and to make any corrections via pulses to the corresponding motor which may be required.

Sensors 34, 36, 38 operate in a similar manner. It must be noted that either of the translation sensors or the color integration sensors are used. The sensors are not used at the same time. The color integration sensors are useful for detecting light which has passed through a negative. Signals proportional to light intensity are fedback to the computer via analog-to-digital converter 86 for comparison with a desired density point value. Microcomputer 82 is programmed to generate pulses to effect any desired filtration changes prior to exposure of the photographic paper. Once the desired density point values are obtained, the shutters are opened (or the paper is inserted into its proper position) and the exposure is made.

Examination will now be made of another embodiment of the invention. The main distinction between the embodiment illustrated in FIGS. 6 and 7 and the previously described embodiments is the drive means. The embodiment of FIGS. 6 and 7 operates either with or without the sensors as does the previously-described embodiment. However, the embodiment of FIGS. 6 and 7 utilizes a linear cam in conjunction with a spring for movement of the carrier frames. As can best be seen in FIG. 7, linear cam 76 bears against roller 78 on bracket 68. When pulses are supplied to motor 52, thus driving the same, cam 76 turns, depending upon the direction of rotation of the motor, thus turning roller 78 and moving frame 60. Spring 80 biases frame 60 toward cam 78 so that the frame is accurately moved in both directions of travel. Equal degrees of cam rotation produce the same distance of lateral travel of frame 60 regardless of the position of frame 60.

It will thus be apparent that according to the present invention a subtractive color printing device is provided wherein extremely accurate color filtration values may be produced and, more importantly, reproduced once obtained. Further, the reproduction of such filtration values is done accurately and quickly.

While a preferred embodiment of the invention and several variations thereof have been described, it is appreciated that variations and modifications may be made without departing from the spirit of the invention.

It is claimed and desired to secure by Letters Patent:

1. A subtractive color printing device for use between a source of white light and a color negative or transparency intended to be exposed to at least a portion of the spectrum of such source, said device, in operative condition, comprising, means defining an aperture disposed in the exposure path between the light source and such a negative or transparency, plural color filter means each mounted for independent adjustment to a plurality of different positions distributed between one position fully exposing, and another position fully spanning said aperture, stepper motor means operatively connected to said filter means for adjusting the same to such different positions in one or more uniform discrete steps, computer means operatively connected to said motor means, said computer means being operable to apply digital voltage pulses to said motor means, each such pulse producing a step in said motor means, memory means operatively connected to said computer means, said memory means havng stored therein density point values for each filter and having a calibration-determined filter position value associated with each such density point value, and input means operatively connected to said computer means for instructing the same, said input means including a key pad for selecting density point values for each filter.

2. The device of claim 1, wherein said stepper motor means includes, for each filter means, a stepper motor, and the operative connection between each stepper motor and its associated filter means comprises a screw shaft threadably engaged with the filter means.

3. The device of claim 1, wherein each plural color filter means includes a carrier frame and a color filter supported thereby, each said frame being slidably mounted to facilitate positional adjustment thereof.

4. A method of using the apparatus of claim 1 including the steps of, calibrating said apparatus with the use of a densitometer by, positioning the densitometer for detection of filtered light, adjusting said color filter means so that said aperture is fully exposed, causing said computer means to drive said filter means by steps, and entering density point values and an associated filter position value into said memory means; and selecting filtration values by entering desired density point values with said key pad.

5. In a color printer of the type having a light source and color filters through which the source shines to generate light having a selected color spectrum, a stepper motor operatively connected to each such filter for moving its associated filter in discrete uniform steps to vary the color spectrum of such generated light, a memory having stored therein a range of density point values for each filter and having further stored therein, associated with each density point value, a filter position value, such filter position value identifying a filter position, a computer operatively connected to each of said motors and to said memory, said computer being operable to apply digital voltage pulses to each of said motors, each such pulse producing a step in its associated motor, and a keyboard, operatively connected to said computer, for selecting desired density point values for each filter;

said computer being operable to drive a selected filter to the position identified by the selected density point value.

6. A method of calibrating the apparatus of claim 5 with the use of a densitometer including the steps of, positioning the densitometer for detection of filtered light, adjusting such color filters so that there is no filtration of the light, causing said computer to drive a filter by steps; and using said keyboard to enter density point values and an associated filter position value into said memory.

* * * * *